United States Patent
Wada et al.

(10) Patent No.: US 7,050,232 B2
(45) Date of Patent: May 23, 2006

(54) OPTICAL CIRCULATOR AND OPTICAL SWITCH

(75) Inventors: Shusuke Wada, Minato-ku (JP); Shohei Abe, Minato-ku (JP); Tomokazu Imura, Minato-ku (JP); Hiroaki Ono, Minato-ku (JP); Tsugio Tokumasu, Minato-ku (JP)

(73) Assignee: FDK Corporation, Tokyo (JP)

( * ) Notice: Subject to any disclaimer, the term of this patent is extended or adjusted under 35 U.S.C. 154(b) by 188 days.

(21) Appl. No.: 10/381,474

(22) PCT Filed: Oct. 1, 2001

(86) PCT No.: PCT/JP01/08626

§ 371 (c)(1),
(2), (4) Date: Mar. 26, 2003

(87) PCT Pub. No.: WO02/29473

PCT Pub. Date: Apr. 11, 2002

(65) Prior Publication Data

US 2004/0012854 A1    Jan. 22, 2004

(30) Foreign Application Priority Data

Oct. 3, 2000    (JP) ............................. 2000-304117

(51) Int. Cl.
*G02B 27/28* (2006.01)
*G02B 5/30* (2006.01)

(52) U.S. Cl. ................. 359/494; 359/495; 359/497; 359/483; 385/11; 372/703

(58) Field of Classification Search ............... 359/280, 359/281–284, 484, 494–497, 900, 483; 385/11, 385/27, 15, 31, 33, 34, 36, 39; 372/703
See application file for complete search history.

(56) References Cited

U.S. PATENT DOCUMENTS 5,237,445 A * 8/1993 Kuzuta ...................... 359/281

(Continued)

FOREIGN PATENT DOCUMENTS

EP        0 782 029        7/1997

(Continued)

OTHER PUBLICATIONS

Masafumi Koga et al., "Polarization-Insensitive High-Isolation Optical Nonreciprocal Device for Circulator Application", IEICE Technical Report, May 24, 1991, vol. 91, No. 61, pp. 1-6 (Abstract in English).

*Primary Examiner*—Leonidas Boutsikaris
(74) *Attorney, Agent, or Firm*—Wenderoth, Lind & Ponack, L.L.P.

(57) ABSTRACT

A first separating/combining birefringent element 10, first and second optical-path controlling birefringent elements 11, 12, and a second separating/combining birefringent element 13 are spaced apart. Between the first separating/combining birefringent element and the first optical-path controlling birefringent element, a first polarization rotating means 14 is arranged for changing a polarization direction from an orthogonal relationship to a parallel relationship, or from a parallel relationship to an orthogonal relationship. Also, between the second optical-path controlling birefringent element and the second separating/combining birefringent element, a second polarization rotating means 17 is arranged. The first and second optical-path controlling birefringent elements are oppositely arranged symmetrically on optical axis about an arrangement center thereof, between which is arranged a ½-wavelength plate for rotating a polarization direction of a light on a central optical path 90 degrees, thereby structuring an optical circulator. With a similar structure, an optical switch can be structured by using a ±45-degree variable Faraday rotator in the first and second polarization rotation switch means.

10 Claims, 5 Drawing Sheets

U.S. PATENT DOCUMENTS

| | | | |
|---|---|---|---|
| 5,428,477 A * | 6/1995 | Siroki | 359/484 |
| 6,049,425 A * | 4/2000 | Watanabe et al. | 359/484 |
| 6,091,866 A * | 7/2000 | Cheng | 385/11 |
| 6,178,044 B1 * | 1/2001 | Li et al. | 359/484 |
| 6,226,115 B1 * | 5/2001 | Shirasaki et al. | 359/280 |
| 6,636,651 B1 * | 10/2003 | Li | 385/11 |
| 6,762,879 B1 * | 7/2004 | Li | 359/484 |

FOREIGN PATENT DOCUMENTS

| | | | |
|---|---|---|---|
| JP | 63-220109 | * | 9/1988 |
| JP | 5-88112 | | 4/1993 |
| JP | 2000-89164 | * | 3/2000 |
| JP | 2001-242420 | | 9/2001 |
| JP | 2001-337296 | | 12/2001 |
| WO | WO 94/09400 | * | 4/1994 |
| WO | 99/45738 | | 9/1999 |
| WO | WO 99/45738 | * | 9/1999 |

* cited by examiner

OPTICAL CIRCULATOR AND OPTICAL SWITCH

TECHNICAL FIELD

The present invention relates to an optical circulator for separating light passing through a transmission line or an optical switch for switching an optical path, in the field of optical communication, optical measurement and the like. More specifically, the present invention relates to an optical circulator and optical switch having a ½-wavelength plate provided at a center of an optical part arrangement to rotate 90 degrees the polarization direction of light on a central optical path. The frontward and rearward, first and second optical-path controlling birefringent elements are oppositely arranged such that the optical axes are symmetrical about an arrangement center thereof. The typical example of the present invention is an optical circulator of a 4-port cyclic type or an optical switch of a 2×2 type.

BACKGROUND OF THE INNVENTION

The optical circulator is an optical device having a light separating function to output an input light from a certain port only to another particular port (e.g., output an input light from a first port P1 to a second port P2, and output an input light from a second port P2 to a third port P3). Meanwhile, the optical switch is an optical device having an optical-path switching function to output an input light from a first input port I1 to either a first output port O1 or a second output port O2, and output an input light from a second input port I2 to either a second output port O2 or a first output port O1.

Usually, the optical circulator uses a 45-degree Faraday rotator for applying a fixed magnetic field by a permanent magnet. By rotating the polarization plane 45 degrees in a predetermined direction, the non-reciprocality of a light ray is realized. Although the optical switch realizes optical-path switching by the use of a variable Faraday rotator for changing the direction of an applied magnetic field due to an electromagnet, basic parts can be structured nearly in a similar manner.

Conventionally, there have been developed various structures of optical circulators and optical switches. There is, as one example of those, a structure in which four birefringent elements are arranged in one row with spacing, and sets of a Faraday rotator and a ½-wavelength plate are respectively inserted between the birefringent elements, to provide ports at both ends (e.g. see JP-A-2000-89164). Due to this, an optical circulator can be structured which couples input light from a first port positioned at one end to a second port at the opposite end, input light from a second port to a third port at its opposite end, input light from a third port to a fourth port at its opposite end, and input light from the fourth port to the first port at its opposite end, respectively.

In the above conventional structure, the ½-wavelength plate in a part (two plates positioned nearby the both ends) uses a combination, for each optical path, of four ½-wavelength plates different in the optical-axis direction. Also, used in the arrangement center are ½-wavelength plates in combination arranged side by side with two-piece spacing. Thus, the structure is complicated and the parts are many in the number.

SUMMARY OF THE INVENTION

An object of the present invention is to provide an optical circulator and optical switch which can reduce the number of parts while maintaining a preferred characteristic.

According to a first aspect of the present invention, there is provided an optical circulator comprising a first separating/combining birefringent element for separating light in an orthogonal relationship with the polarization direction on the same optical path, and combining light on different optical paths; first and second optical-path controlling birefringent elements for controlling an optical path depending on a polarization direction; and a second separating/combining birefringent element for separating light on the same optical path and combining light in an orthogonal relationship with the polarization direction on different optical paths. The first separating/combining birefringent element, the first and second optical-path controlling birefringent elements and the second separating/combining birefringent element are arranged in this order with spacing, and the first and second optical-path controlling birefringent elements are oppositely arranged such that optical axes are symmetric about an arrangement center thereof.

The optical circulator further comprises a first polarization rotating means for changing a polarization direction from an orthogonal to a parallel or from a parallel to an orthogonal, arranged between the first separating/combining birefringent element and the first optical-path controlling birefringent element; a second polarization rotating means for changing a polarization direction from an orthogonal to a parallel or from a parallel to an orthogonal, arranged between the second optical-path controlling birefringent element and the second separating/combining birefringent element; a ½-wavelength plate, for rotating 90 degrees a polarization direction of a light on a central optical path, arranged between the first optical-path controlling birefringent element and the second optical-path controlling birefringent element; and ports arranged on a side of one of the separating/combining birefringent element and on a side of the other of the separating/combining birefringent element.

Herein, the first polarization rotating means and the second polarization rotating means may comprise a combination of a 45-degree Faraday rotator, a set of two ½-wavelength plates arranged side by side symmetrically in optical axes on both optical paths to rotate a polarization direction 45 degrees, and a ½-wavelength plate for rotating 90 degrees a polarization direction of a light on a lower-staged optical path. These are arranged symmetric about a center of the arrangement.

Meanwhile, according to a second aspect of the invention, there is provided an optical switch comprising a separating birefringent element for separating light in an orthogonal relationship of polarization direction on the same optical path; first and second optical-path controlling birefringent elements for controlling an optical path depending on a polarization direction; and a combining birefringent element for combining light in an orthogonal relationship of polarization direction on different optical paths. The separating birefringent element, the first and second optical-path controlling birefringent elements and the combining birefringent element are arranged in this order with spacing, and the first and second optical-path controlling birefringent elements are oppositely arranged such that optical axes are symmetric about an arrangement center thereof.

The optical switch further comprises a first polarization rotating means having a ±45-degree variable Faraday rotator, for changing a polarization direction from an orthogonal to a parallel. The first polarization rotating means is arranged between the separating/combining birefringent element and the first optical-path controlling birefringent element.

The optical switch further comprises a second polarization rotating means having a ±45-degree variable Faraday rotator, for changing a polarization direction from a parallel to an orthogonal. The second polarization rotating means is arranged between the second optical-path controlling birefringent element and the combining birefringent element.

The optical switch further comprises a ½-wavelength plate, for rotating 90 degrees a polarization direction of light on a central optical path, arranged between the first optical-path controlling birefringent element and the second optical-path controlling birefringent element; and input ports arranged on a side of the separating birefringent element and output ports arranged on a side of the combining birefringent element of the arrangement.

In the second aspect of the invention described above, the first polarization rotating means and the second polarization rotating means comprise, for example, a combination of a ±45-degree Faraday rotator, a set of two ½-wavelength plates arranged side-by-side symmetrically in optical axes on both optical paths to rotate a polarization direction 45 degrees, and a ½-wavelength plate for rotating 90 degrees a polarization direction of light on a lower-staged optical path. These are arranged symmetric about the arrangement center.

Although the wavelength plate serves to provide a phase difference of a predetermined wavelength to between orthogonal straight-line polarization components, the ½-wavelength plate in the present specification is to be assumably construed in a broad sense, assumably including those to cause a phase difference of (½+integer) respectively. Incidentally, the ½-wavelength plate, because of a tendency to change a polarization direction of input light symmetrically about an optical axis thereof, is a reciprocal optical part capable of rotating a polarization plane of input light in a predetermined direction by previously setting an optical axis in a proper direction. Also, as for the ½-wavelength plate for insertion on a part of an optical path, it is needless to say that the structure combined with a transparent member and adjusted the same in outer shape as another optical part thereby facilitating assembling is included in the invention.

DETAILED DESCRIPTION OF THE INVENTION

Figure 1:
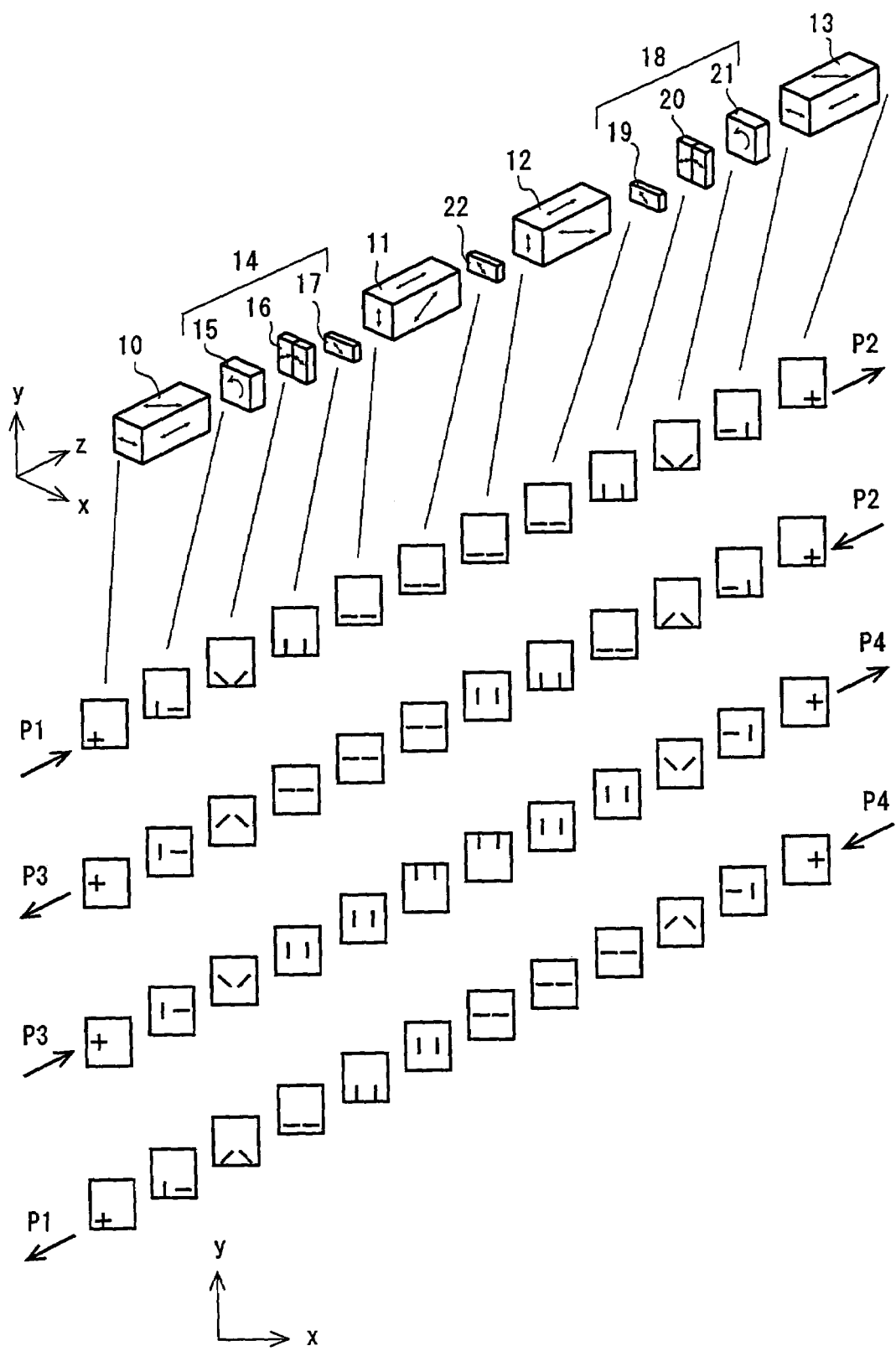
FIG. 1 is an explanatory view of an optical circulator according to an embodiment of the present invention.
Figure 2A:
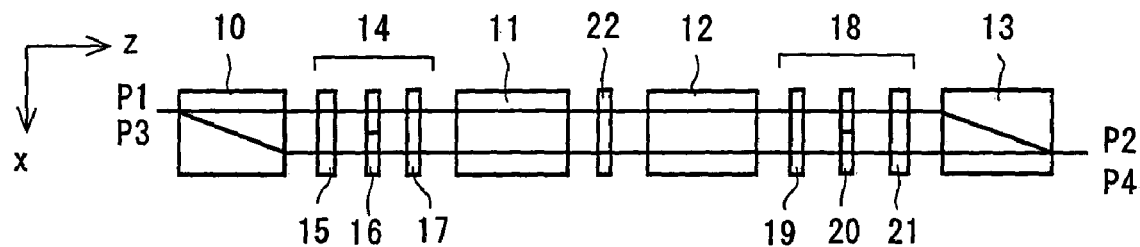
FIG. 2A is a plan view showing an optical path of the optical circulator shown in FIG. 1.
Figure 2B:
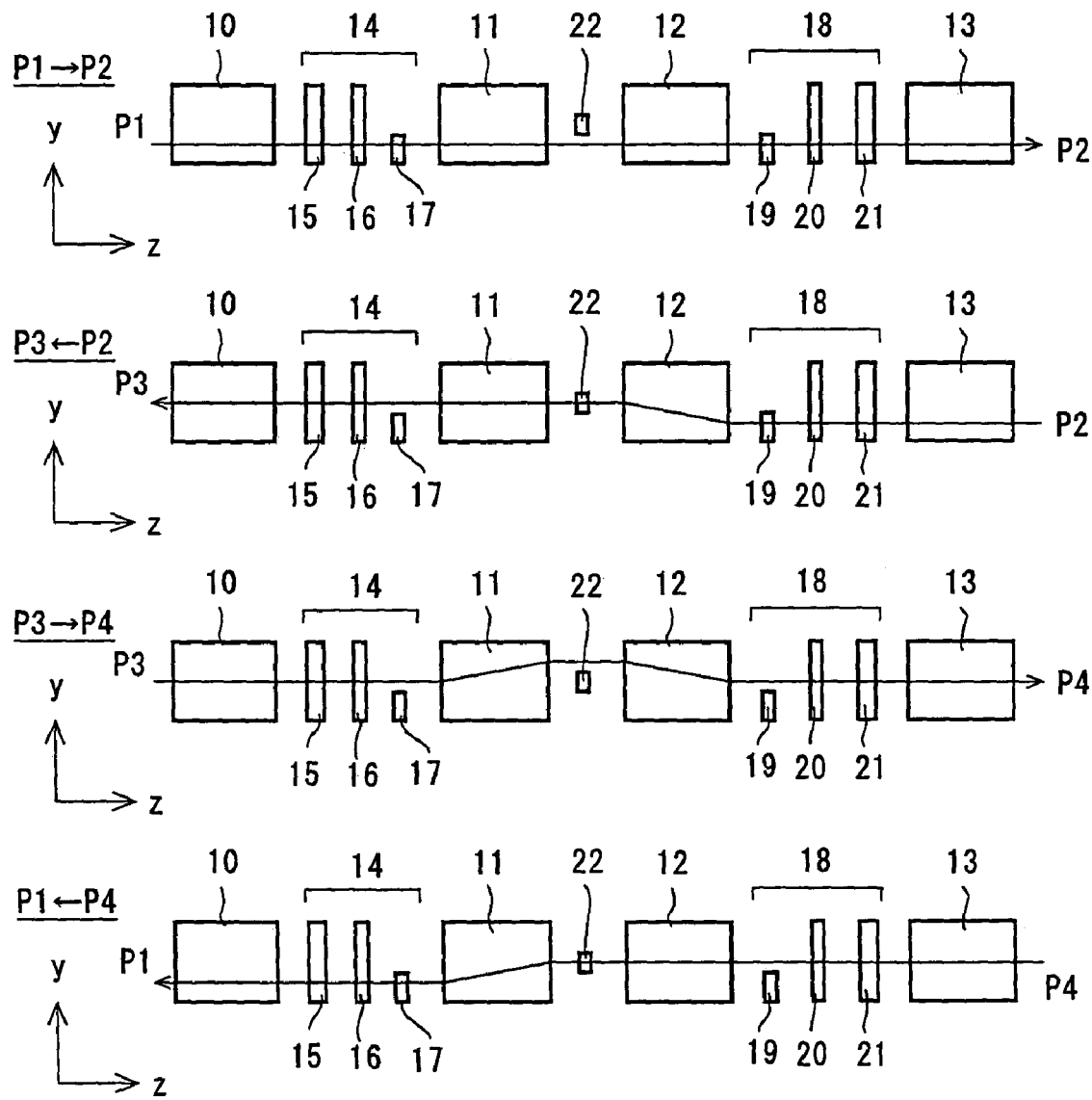
FIG. 2B is a side view showing an optical path of the optical circulator shown in FIG. 1.

FIG. 1 is an explanatory view showing one embodiment of an optical circulator according to the present invention, while FIG. 2 is an explanatory view of an optical path of the same which is for a 4-port cyclic-type optical circulator. FIG. 1 shows an arrangement state of optical parts and a polarization state at a portion between the optical parts. Incidentally, the arrow in the optical part denotes an optical-axis direction or a Faraday-rotation direction. For the purpose of explanation, coordinate axes are set up as set forth in the following. The arrangement direction of the optical parts is taken as the z-direction (depth direction on the drawing), while the two directions orthogonal thereto are taken as the x-direction (horizontal direction on the drawing) and the y-direction (vertical direction on the drawing). Also, concerning rotation direction, a clockwise direction as viewed in the z-direction is taken as a plus (+) side.

In the z-direction are arranged a first separating/combining birefringent element 10 for separating, in the x-direction, the light in an orthogonal relationship with respect to the polarization direction on the same optical path, and for combining in the x-direction the light on different optical paths; a first optical-path controlling birefringent element 11 for allowing normal light to travel straight and abnormal light to shift an optical path toward +y-direction depending on a polarization direction; a second optical-path controlling birefringent element 12 for allowing normal light to travel straight and abnormal light to shift an optical path toward −y-direction also depending on a polarization direction; and a second separating/combining birefringent element 13 for separating, in the x-direction, the light in an orthogonal relationship with respect to the polarization direction on the same optical path, and for combining in the x-direction the light on different optical paths, spaced apart in this order. Accordingly, the first optical-path controlling birefringent element 11 and the second optical-path controlling birefringent element 12 are oppositely arranged such that their optical axes are in symmetry about an arrangement center.

A first polarization rotating means 14 for conversion of the polarization direction from an orthogonal relationship to a parallel relationship (from parallel to orthogonal in the reverse z-direction) is arranged between the first separating/combining birefringent element 10 and the first optical-path controlling birefringent element 11, as viewed in the z-direction. The first polarization rotating means 14 comprises a combination of a 45-degree Faraday rotator 15, a set of two ½-wavelength plates 16 arranged side by side such that the optical axes are in symmetry on both the left/right optical paths, and a ½-wavelength plate 17 acting on only the light on the lower-staged optical path to rotate its polarization direction by 90 degrees. Similarly, a second polarization rotating means 18 for conversion of the polarization direction from a parallel relationship to an orthogonal relationship (from orthogonal to parallel in the reverse z-direction) is arranged between the second optical-path controlling birefringent element 12 and the second separating/combining birefringent element 13, as viewed in the z-direction. The second polarization rotating means 18 also comprises a combination of a ½-wavelength plate 19 acting on only the light on the lower-staged optical path to rotate its polarization direction by 90 degrees, a set of two ½-wavelength plates 20 arranged side by side such that the optical axes are in symmetry on both the left/right optical paths, and a 45-degree Faraday rotator 21.

Figure 3A:
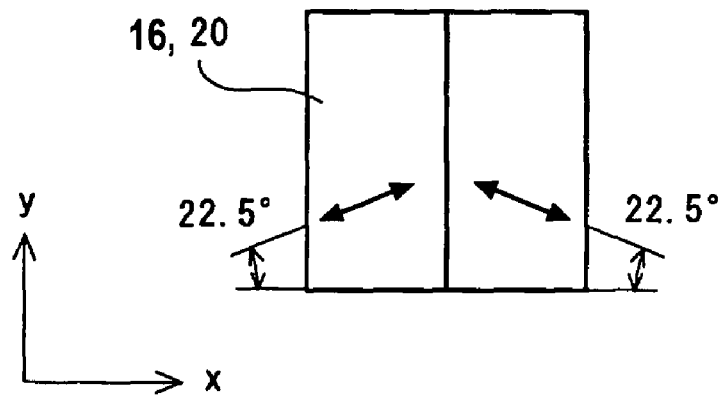
FIGS. 3A, 3B and 3C are explanatory views showing a direction of an optical axis of a ½-wavelength plate and ¼-wavelength plate of the optical circulator shown in FIG. 1.
Figure 3B:
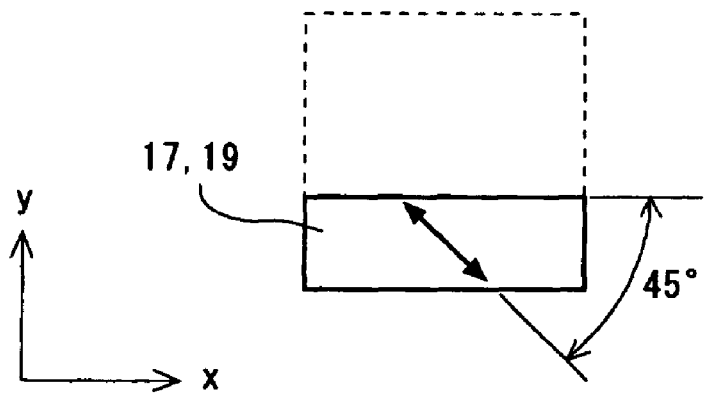

Incidentally, the two 45-degree Faraday rotators 15, 21 are 45-degree fixed Faraday rotators using a permanent magnet and having a Faraday rotation angle of 45 degrees. Also, each of the set of two ½-wavelength plates 16, 20, as shown in FIG. 3A, has a left optical path having an optical axis inclining −22.5 degrees with respect to the x-direction and a right optical path having an optical axis inclining 22.5 degrees with respect to the x-direction, which are integrated symmetrically about the y-axis. The ½-wavelength plates 17, 19 have an optical axis inclining 45 degrees with respect to the x-direction, as shown in FIG. 3B.

Figure 3C:
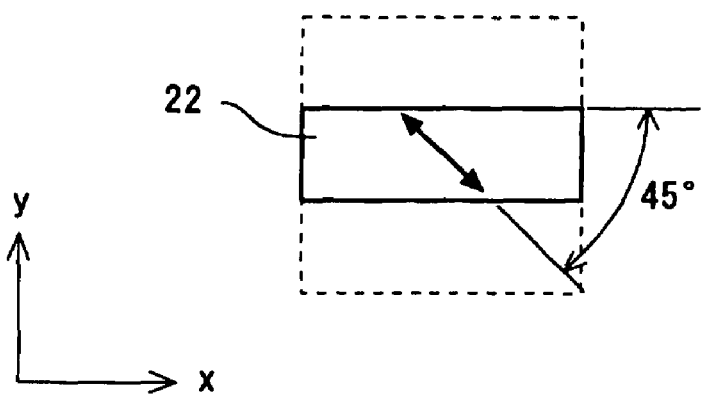

Furthermore, viewing in the z-direction, a ½-wavelength plate 22 is provided between the first optical-path controlling birefringent element 11 and the second optical-path controlling birefringent element 12, which acts on only the light on a middle-staged optical path (central optical path in the y-direction) to rotate the polarization direction thereof by 90 degrees. This ½-wavelength plate 22 has an optical axis also inclining 45 degrees with respect to the x-direction, as shown in FIG. 3C.

Then, viewing in the z-direction, on a side of the first separating/combining birefringent element 10, a first port P1 in the lower stage and a third port P3 in the middle stage are set deviated in the y-direction while, on a side of the second separating/combining birefringent element 13, a second port P2 in the lower stage and a fourth port P4 in the middle stage are set deviated in the y-direction.

Now, an explanation will be made of the operation of the optical circulator. FIG. 2A shows an optical path viewing in an-y-direction, while B shows an optical path viewing in an-x-direction.

(First Port P1→Second Port P2)

The light is inputted in the z-direction at the first port P1 in the lower stage, and normal light is allowed to travel straight in the first separating/combining birefringent element 10 while abnormal light is refracted and optically separated in the x-direction. In the first polarization rotating means 14, the polarization direction for the shaft of light is changed from an orthogonal into a parallel relationship. Namely, the light orthogonal in polarization direction is rotated 45 degrees in the polarization direction by the first 45-degree Faraday rotator 15, and then enters the ½-wavelength plate 16. Because the ½-wavelength plate has a tendency to symmetrically change the polarization direction of input light about its optical axis, the input shaft of light at each side rotates 45 degrees oppositely to each other into a vertical orientation with respect to the x-axis. Both rotated shafts of light pass through the ½-wavelength plate 17 positioned in the lower stage, thereby being rotated 90 degrees in the polarization direction into a parallel relationship with the x-axis. Accordingly, both side shafts of light, because of normal light for the first optical-path controlling birefringent element 11, directly travels straight through an optical path in the lower stage. Because the central ½-wavelength plate 22 is inserted only in the middle-staged optical path, the light on the lower-staged optical path bypasses the central ½-wavelength plate without undergoing any action. This light, because of normal light also for the second optical-path controlling birefringent element 12, travels straight through the lower-staged optical path without change. Then, due to the second polarization rotating means 18, the polarization direction is changed from a parallel relationship into an orthogonal relationship. Namely, the polarization direction is rotated 90 degrees by the ½-wavelength plate 19 into a vertical orientation with respect to the x-axis, and the polarization direction rotates 45 degrees respectively on the ½-wavelength plate 20 and the 45-degree Faraday rotator 21. Thus, the side shafts of light develop an orthogonal relationship. Then, because the light is combined in the x-direction by the second separating/combining birefringent element 13, it is outputted at the second port P2 in the lower stage.

(Second Port P2→Third Port P3)

The light is inputted in the −z-direction (reverse) at the second port P2 in the lower stage, and normal light is allowed to travel straight in the second separating/combining birefringent element 13 while abnormal light is refracted and optically separated in the x-direction. In the second polarization rotating means 18, the polarization direction for the shaft of light is changed from an orthogonal relationship into a parallel relationship. Namely, the side shafts of light orthogonal in polarization direction are rotated 45 degrees respectively in polarization direction by the second 45-degree Faraday rotator 21 and rotated 45 degrees in polarization direction oppositely to each other by the ½-wavelength plate 20 into a parallel relationship with the x-axis. Both side shafts of light pass through the ½-wavelength plate 19 positioned in the lower stage, thereby being rotated in polarization direction to have a polarization direction vertical to the x-axis. Both side shafts of light, because of abnormal light for the second optical-path controlling birefringent element 12, are refracted upward to travel in the middle-staged optical path. Due to the central ½-wavelength plate 22, the polarization direction is rotated 90 degrees into a parallel relationship with the x-axis. This light, because of normal light for the first optical-path controlling birefringent element 11, travels, as it is, in the middle-staged optical path. Then, by the first polarization rotating means 14, the polarization direction is changed from a parallel to orthogonal relationship. Namely, bypassing the ½-wavelength plate 17, the rotation direction is rotated 45 degrees respectively by the ½-wavelength plate 16 and the 45-degree Faraday rotator 15. Thus, the shafts of light mutually develop an orthogonal relationship. Then, because the light is combined in the x-direction by the first separating/combining birefringent element 10, it is outputted at the third port P3 in the middle stage.

(Third Port P3→Fourth Port P4)

The light is inputted in the z-direction at the third port P3 in the middle stage, and normal light is allowed to travel straight in the first separating/combining birefringent element 10 while abnormal light is refracted and optically separated in the x-direction. In the first polarization rotating means 14, the polarization direction is changed from an orthogonal relationship into a parallel relationship. Namely, the shafts of light orthogonal in polarization direction are respectively rotated 45 degrees in polarization direction by the first 45-degree Faraday rotator 15, and rotated 45 degrees oppositely to each other by the ½-wavelength plate 16, thus being placed in a normal relationship with respect to the x-axis. Both shafts of light bypass the ½-wavelength plate 17 positioned in the lower stage. Accordingly, because of abnormal light for the first optical-path controlling birefringent element 11, the light is refracted upward to travel in an optical path in the upper stage. Because the central ½-wavelength plate 22 is inserted only on the middle-staged optical path, the light on the upper-staged optical path bypasses the central ½-wavelength plate 22 without undergoing any action. This light, because of abnormal light for the second optical-path controlling birefringent element 12, is refracted downward this time by the second optical-path controlling birefringent element 12 to travel on an optical path in the middle stage. Then, by the second polarization rotating means 18, the polarization direction is changed from a parallel relationship to an orthogonal relationship. Namely, bypassing the ½-wavelength plate 19, the polarization direction is rotated 45 degrees respectively by the ½-wavelength plate 20 and the 45-degree Faraday rotator 21. Thus, the shafts of light develop an orthogonal relationship. Then, because the light is combined in the x-direction by the second separating/combining birefringent element 13, it is outputted at the fourth port P4 in the middle stage.

(Fourth Port P4→First Port P1)

The light is inputted in the −z-direction (reverse) at the fourth port P4 in the middle stage, and normal light is allowed to travel straight in the second separating/combining birefringent element 13 while abnormal light is refracted and optically separated in the x-direction. In the second polarization rotating means 18, the polarization direction is changed from an orthogonal relationship into a parallel relationship. Namely, the shafts of light orthogonal in polarization direction are rotated 45 degrees respectively in polarization direction by the second 45-degree Faraday rotator 21, and rotated 45 degrees in polarization direction oppositely to each other by the ½-wavelength plate 20 into a parallel relationship with the x-axis to bypass the ½-wavelength plate 19 positioned in the lower stage. Accordingly, both shafts of light, because of normal light for the second optical-path controlling birefringent element 12, travel straight as they are. Due to the central ½-wavelength plate 22, the polarization direction is rotated 90 degrees into a vertical relationship with the x-axis. This light, because of abnormal light for the first optical-path controlling birefringent element 11, is refracted downward to travel an optical path in the lower stage. Then, due to the first polarization rotating means 14, the polarization direction is changed from a parallel relationship to an orthogonal relationship. Namely, due to the ½-wavelength plate 17, the rotation direction is rotated 90 degrees. Due to the ½-wavelength plate 16 and the 45-degree Faraday rotator 15, the polarization direction is respectively rotated 45 degrees. Thus the shafts of light develop an orthogonal relationship. Then, because the light is combined in the x-direction by the first separating/combining birefringent element 10, it is outputted at the first port P1 in the lower stage.

In this manner, an optical circulator is realized which is of a 4-port cyclic type of from first port P1 to second port P2, from second port P2 to third port P3, from third port P3 to fourth port P4 and further from fourth port P4 to first port P1. Of course, unless the first port or fourth port is used, it can be used also as a 3-port type optical circulator without changing the structure.

Figure 4:
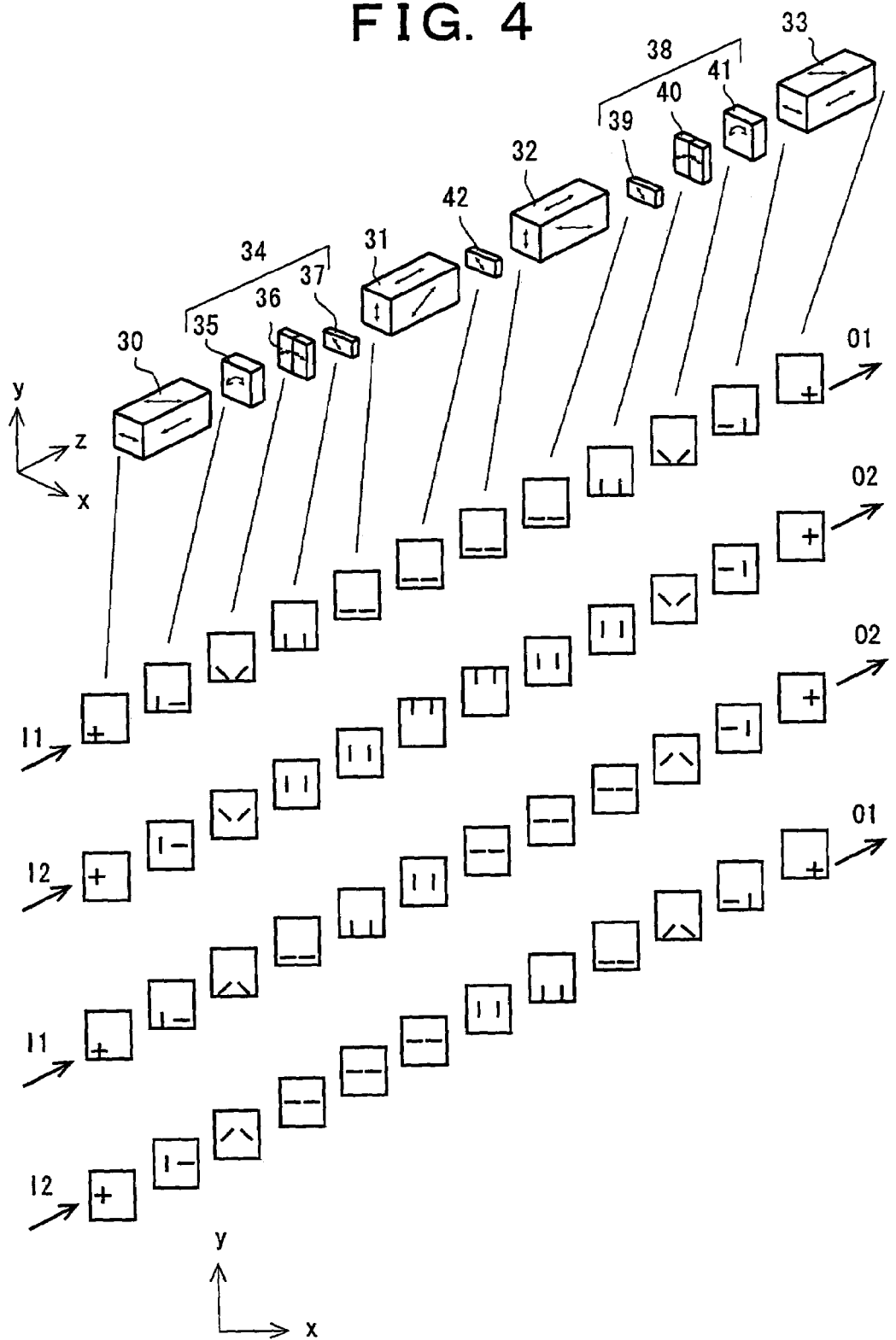
FIG. 4 is an explanatory view of an optical switch according to an embodiment of the present invention.
Figure 5A:
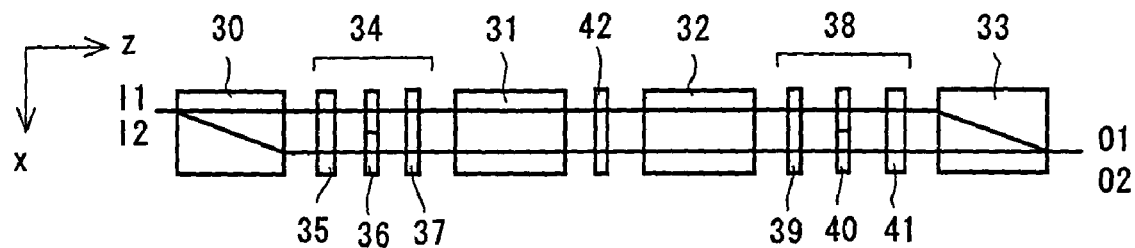
FIG. 5A is a plan view showing an optical path of the optical switch shown in FIG. 4.
Figure 5B:
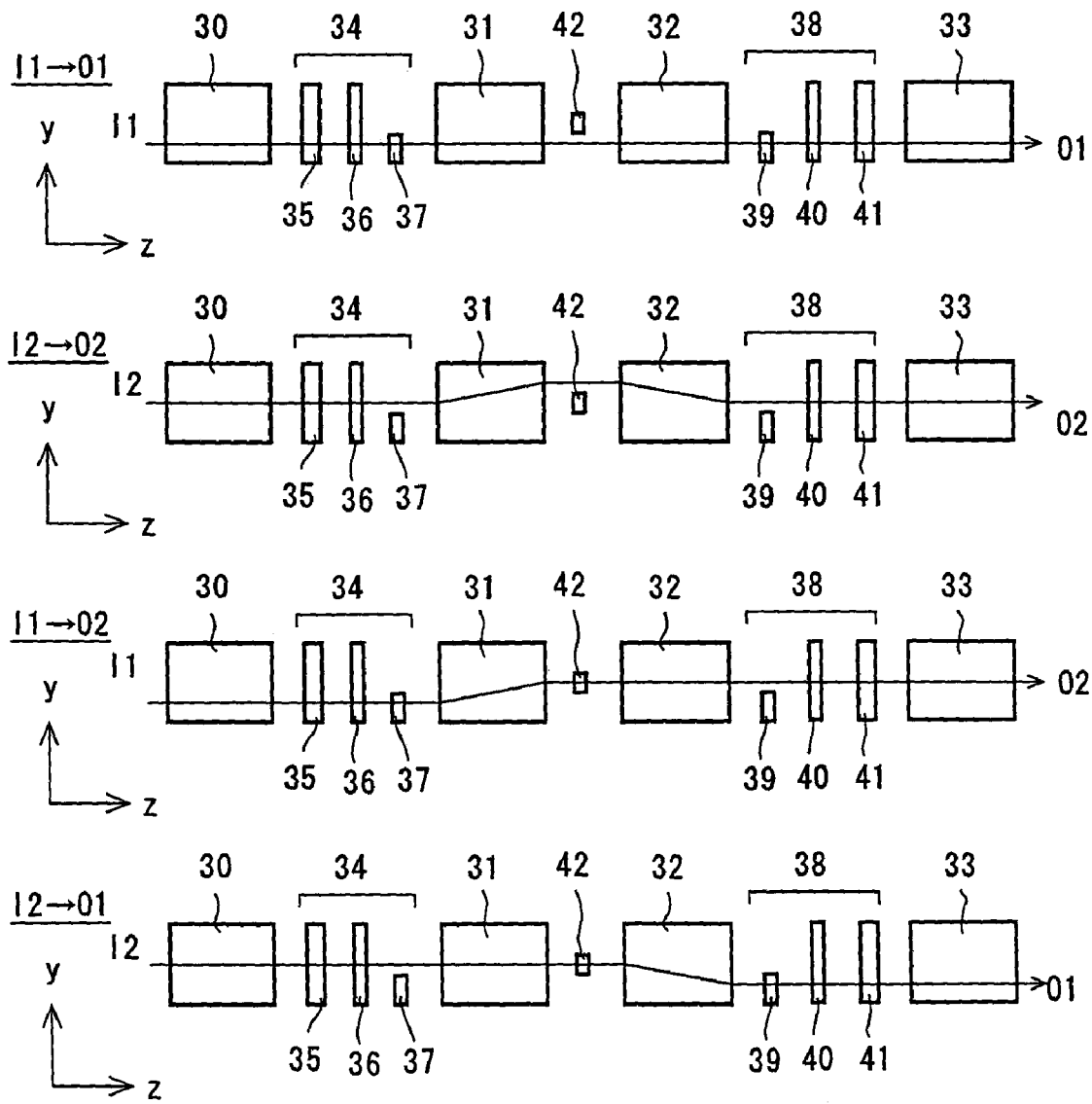
FIG. 5B is a side view showing an optical path of the optical switch shown in FIG. 4.

FIG. 4 is an explanatory view showing one embodiment of an optical switch according to the present invention, while FIG. 5 is an explanatory view of an optical path thereof which is for a 2×2-type optical switch. FIG. 4 shows an arrangement of optical parts and a polarization state between the optical parts. Incidentally, the arrow in the optical part denotes an optical-axis direction or a Faraday-rotation direction. Also, in order to make the explanation easier to understand, coordinate axes are set up as in the above example of the optical circulator as follows. The arrangement direction of the optical parts is taken as the z-direction (in a depth direction on the drawing), while the two directions orthogonal thereto are taken as the x-direction (horizontal direction on the drawing) and the y-direction (vertical direction on the drawing). Also, concerning the rotation direction, a clockwise direction as viewed in the z-direction is taken as a plus side.

In the z-direction are arranged a separating birefringent element 30 for separating, in the x-direction, the light in an orthogonal relationship of the polarization direction on the same optical path; a first optical-path controlling birefringent element 31 for allowing normal light to travel straight and abnormal light to shift an optical path toward +y-direction depending on a polarization direction; a second optical-path controlling birefringent element 32 for allowing normal light to travel straight and abnormal light to shift an optical path toward −y-direction and depending on a polarization direction; and a combining birefringent element 33 for combining the light in an orthogonal relationship of polarization direction on the optical paths different in the x-direction, spaced apart in this order. Accordingly, the first optical-path controlling birefringent element 31 and the second optical-path controlling birefringent element 32 are oppositely arranged symmetrically in their optical axes about an arrangement center.

Viewing in the z-direction, a first polarization rotating means 34 for conversion of the polarization direction from an orthogonal relationship to a parallel relationship is arranged between the separating birefringent element 30 and the first optical-path controlling birefringent element 31. The first polarization rotating means 34 comprises a combination of a first +45-degree variable Faraday rotator 35, a set of two ½-wavelength plates 36 arranged side by side such that the optical axes are in symmetry on the left/right optical paths, and a ½-wavelength plate 37 for acting on only the light on the lower-staged optical path to rotate its polarization direction by 90 degrees. Similarly, a second polarization rotating means 38 for conversion of the polarization direction from a parallel relationship to an orthogonal relationship is arranged between the second optical-path controlling birefringent element 32 and the combining birefringent element 33. The second polarization rotating means 38 also comprises a combination of a ½-wavelength plate 39 for acting on only the light on the lower-staged optical path to rotate its polarization direction by 90 degrees, a set of two ½-wavelength plates 40 arranged side by side such that the optical axes are in symmetry on the left/right optical paths, and a second ±45-degree variable Faraday rotator 41. Incidentally, the two ±45-degree variable Faraday rotators 35, 41 are variable Faraday rotators of a structure to apply an external magnetic field to the Faraday element by the electromagnet, wherein the application magnetic field can be controlled in a direction by switching the energizing direction of the electromagnet thereby making it possible to switch Faraday rotation to +45 degrees or −45 degrees. Herein, both ±45-degree variable Faraday rotators 35, 41 are to be structurally switched together to have the same Faraday rotation direction. Also, each of the set of two ½-wavelength plates 36, 40, similarly to the showing in Fig. FIG. 3A, has a left optical path having an optical axis inclining −22.5 degrees with respect to the x-direction and a right optical path having an optical axis inclining 22.5 degrees with respect to the x-direction, which are mutually integrated symmetrically about the y-axis. The ½-wavelength plate 37, 39 has an optical axis inclining 45 degrees with respect to the x-direction, similarly to the showing in FIG. 3B.

Furthermore, viewing in the z-direction, a ½-wavelength plate 42 is provided between the first optical-path controlling birefringent element 31 and the second optical-path controlling birefringent element 32, which acts for only the light in a middle-staged optical path (central optical path in the y-direction) to rotate its polarization direction by 90 degrees. This ½-wavelength plate 42 also inclines in the optical axis with respect to the x-direction, similarly to the ½-wavelength plate shown in FIG. 3C.

Viewing in the z-direction, on a side of the separating birefringent element 30, a first input port I1 in the lower stage and a second input port in the middle stage are deviated in the y-direction while, on a side of the combining birefringent element 33, a first output port O1 in the lower stage and a second output port O2 in the middle stage are deviated in the y-direction. Accordingly, this optical switch is of quite the same structure as the embodiment of the optical circulator, except for the structure of Faraday rotator.

Now, an explanation will be made on the operation of the optical switch. FIG. 5A shows an optical path viewing in a −y-direction, while B shows an optical path viewing in a −x-direction.

First, an application magnetic field is set up in a direction (counterclockwise direction) so that the Faraday rotation direction is minus as viewing the ±45-degree variable Faraday rotator 35, 41 in the z-direction.

(First Input Port I1→First Output Port O1)

The light is inputted in the z-direction at the first input port I1 in the lower stage, and normal light is allowed to travel straight in the separating birefringent element 30 while abnormal light is refracted and optically separated in the x-direction. In the first polarization switch means 34, the polarization direction is changed from an orthogonal into a parallel relationship. Namely, the shapes of light orthogonal in polarization direction are respectively rotated −45 degrees in the first ±45-degree variable Faraday rotator 35 and then enter to the ½-wavelength plate 36. Because the ½-wavelength plate has a tendency to symmetrically change the polarization direction of input light about its optical axis, the input shafts of light rotate 45 degrees oppositely to each other into a vertical relationship with respect to the x-axis. Both shafts of light pass through the ½-wavelength plate 37 positioned in the lower stage thereby being rotated 90 degrees in polarization direction, whereby the polarization direction becomes parallel with the x-axis. Accordingly, both shafts of light, because of normal light for the first optical-path controlling birefringent element 31, directly travels straight through an optical path in the lower stage. Because the central ½-wavelength plate 42 is inserted only in the middle-staged optical path, the light on the lower-staged optical path bypasses the central ½-wavelength plate 42 without undergoing any action. This light, because of normal light also for the second optical-path controlling birefringent element 32, travels straight through the lower-staged optical path without change. Then, due to the second polarization rotating means 38, the polarization direction is changed from the parallel relationship into an orthogonal relationship. Namely, the polarization direction is rotated 90 degrees by the ½-wavelength plate 39 into a vertical relationship with respect to the x-axis, and the polarization direction rotates 45 degrees respectively on the ½-wavelength plate 40 and the ±45-degree variable Faraday rotator 41. Thus, the shafts of light develop an orthogonal relationship. Then, because the light is combined in the x-direction by the combining birefringent element 33, it is outputted at the first output port O1 in the lower stage.

(Second Input Port I2→Second Output Port O2)

The light is inputted in the z-direction at the second input port I2 in the middle stage, and normal light is allowed to travel straight in the separating birefringent element 30 while abnormal light is refracted and optically separated in the x-direction. In the first polarization switch means 34, the polarization direction is changed from an orthogonal relationship into a parallel relationship. Namely, the shafts of light orthogonal in the polarization direction are respectively rotated −45 degrees in the first ±45-degree variable Faraday rotator 35, and rotated 45 degrees oppositely with each other in the ½-wavelength plate 36, to thus be placed in a vertical relationship with respect to the x-axis. Both shafts of light bypass the ½-wavelength plate 37 positioned in the lower stage. Accordingly, because of abnormal light for the first optical-path controlling birefringent element 31, it refracts upward to travel in an optical path in the upper stage. Because the central ½-wavelength plate 42 is inserted only in the middle-staged optical path, the light on the upper-staged optical path bypasses without undergoing any action. This light, because of abnormal light also for the second optical-path controlling birefringent element 32, is refracted downward this time to travel an optical path in the middle stage. Then, by the second polarization rotating means 38, the polarization direction is changed from the parallel relationship into an orthogonal relationship. Namely, the ½-wavelength plate 39 is bypassed, and polarization direction rotates 45 degrees respectively on the ½-wavelength plate 40 and the ±45-degree variable Faraday rotator 41. Thus, the shafts of light develop an orthogonal relationship. Then, because the light is combined in the x-direction by the combining birefringent element 33, it is outputted at the second output port O2 in the middle stage.

Next, an application magnetic field is set up in a direction (clockwise direction) so that the Faraday rotation direction is plus as viewing the ±45-degree variable Faraday rotator 35, 41 in the z-direction.

(First Input Port I1→Second Output Port O2)

The light is inputted in the z-direction at the first input port I1 in the lower stage, and normal light is allowed to travel straight in the separating birefringent element 30 while abnormal light is refracted and optically separated in the x-direction. In the first polarization switch means 34, the polarization direction is changed from an orthogonal into a parallel relationship. Namely, the shafts of light orthogonal in the polarization direction are respectively rotated +45 degrees in the first ±45-degree variable Faraday rotator 35, and the input shafts of light are rotated 45 degrees oppositely with each other in the ½-wavelength plate 36, to thus be placed in a vertical relationship to the x-axis. Both shafts of light pass the ½-wavelength plate 37 positioned in the lower stage, whereby the polarization direction rotates 90 degrees and the polarization direction is placed in a vertical relationship to the x-axis. Accordingly, because of abnormal light for the first optical-path controlling birefringent element 31, it refracts upward to travel in an optical path in the middle stage. Then, due to the central ½-wavelength plate 42, the polarization direction is rotated 90 degrees and is placed parallel with the x-axis. This light, because of normal light for the second optical-path controlling birefringent element 32, directly travels on an optical path in the middle stage. Then, due to the second polarization rotating means 38, the polarization direction is changed from the parallel relationship into an orthogonal relationship. Namely, the ½-wavelength plate 39 is bypassed, and the polarization direction rotates 45 degrees respectively on the ½-wavelength plate 40 and the ±45-degree variable Faraday rotator 41. Thus, the shafts of light develop an orthogonal relationship. Then, because the light is combined in the x-direction by the combining birefringent element 33, it is outputted at the second output port O2 in the middle stage.

(Second Input Port I2→First Output Port O1)

The light is inputted in the z-direction at the second input port I2 in the middle stage, and normal light is allowed to travel straight in the separating birefringent element 30 while abnormal light is refracted and optically separated in the x-direction. In the first polarization switch means 34, the polarization direction is changed from an orthogonal relationship into a parallel relationship. Namely, the shafts of light orthogonal in polarization direction are respectively rotated +45 degrees in the first ±45-degree variable Faraday rotator 35, and rotated 45 degrees oppositely with each other in the ½-wavelength plate 36, to thus be placed in a parallel relationship to the x-axis. Both shafts of light bypass the ½-wavelength plate 37 positioned in the lower stage. Accordingly, because of normal light for the first optical-path controlling birefringent element 31, the light travels straight as it is. Then, due to the central ½-wavelength plate 42, the polarization direction is rotated 90 degrees and placed vertical to the x-axis. This light, because of abnormal light for the second optical-path controlling birefringent element 32, is refracted downward this time to travel on an optical path in the lower stage. Then, due to the second polarization rotating means 38, the polarization direction is changed from the parallel relationship into an orthogonal relationship. Namely, the polarization direction rotates 90 degrees in the ½-wavelength plate 39, and the polarization direction rotates 45 degrees respectively on the ½-wavelength plate 40 and the ±45-degree variable Faraday rotator 41. Thus, the shafts of light develop an orthogonal relationship. Then, because the light is combined in the x-direction by the combining birefringent element 33, it is outputted at the first output port O1 in the lower stage.

In this manner, an optical switch is realized which is of a 2×2 type of from first input port I1 to first output port O1, and from second input port I2 to second output port O2, or from first input port I1 to second output port O2 and from second input port I2 to first output port O1 by switching an application magnetic field. Of course, unless the ports in part are used, it can also be used as an optical switch of a 1×2 type or 2×1 type.

Incidentally, although not shown, in each of the above embodiments, the optical fibers to be coupled to the ports provided two on one side can be easily connected by using a two-cored ferrule.

The present invention, as described above, has a structure having a ½-wavelength plate inserted on a central optical path in a center of an arrangement of optical parts, and first and second optical-path controlling birefringent element positioned forward and rearward thereof that are oppositely arranged such that the optical axes thereof are symmetric about the center of the arrangement. Accordingly, it is possible to obtain an optical circulator and optical switch that maintains preferred characteristics, having a reduced number of ½-wavelength plates and which is easy to assemble.

What is claimed is:

1. An optical circulator comprising:
   a first separating/combining birefringent element for separating light on the same optical path into shafts of light having an orthogonal relationship with respect to a polarization direction, and for combining shafts of light on different optical paths;
   a first optical-path controlling birefringent element for controlling a direction of an optical path depending on the polarization direction;
   a second optical-path controlling birefringent element for controlling a direction of an optical path depending on the polarization direction;
   a second separating/combining birefringent element for separating light on the same optical path into shafts of light, and for combining shafts of light on different optical paths having an orthogonal relationship with respect to the polarization direction, wherein said first separating/combining birefringent element, said first optical-path controlling birefringent element, said second optical-path controlling birefringent element, and said second separating/combining birefringent element are spaced apart along an optical path in the recited order, and wherein said first optical-path controlling birefringent element and said second optical-path controlling birefringent element are oppositely arranged such that optical axes thereof are symmetrical with respect to an arrangement center thereof;
   a first polarization rotating member for changing a relationship of the polarization direction of shafts of light passing therethrough from an orthogonal relationship to a parallel relationship, or from a parallel relationship to an orthogonal relationship, said first polarization rotating member being arranged between said first separating/combining birefringent element and said first optical-path controlling birefringent element;
   a second polarization rotating member for changing a relationship of the polarization direction of shafts of light passing therethrough from an orthogonal relationship to a parallel relationship, or from a parallel relationship to an orthogonal relationship, said second polarization rotating member being arranged between said second optical-path controlling birefringent element and said second separating/combining birefringent element;
   a ½-wavelength plate for rotating the polarization direction of light on a central optical path 90 degrees, said ½-wavelength plate being arranged between said first optical-path controlling birefringent element and said second optical-path controlling birefringent element; and
   ports arranged on a side of said first separating/combining birefringent element and on a side of said second separating/combining birefringent element.

2. The optical circulator of claim 1, wherein each of said first polarization rotating member and said second polarization rotating member includes:
   a ±45-degree Faraday rotator;
   a set of two ½-wavelength plates arranged side-by-side symmetrically with respect to optical axes thereof and on the optical paths of the shafts of light, each of the ½-wavelength plates being operable to rotate a polarization direction of the respective shaft of light passing therethrough 45 degrees; and
   a ½-wavelength plate for rotating the polarization direction of light on a lower-staged optical path 90 degrees.

3. The optical circulator of claim 2, wherein said first polarization rotating member and said second polarization rotating member are arranged symmetrically about a center of said optical circulator.

4. The optical circulator of claim 2, wherein said ±45-degree Faraday rotator, said set of two ½-wavelength plates, and said ½-wavelength plate of each of said first polarization rotating member and said second polarization rotating member are spaced apart along the optical path in the recited order.

5. The optical circulator of claim 1, wherein only said ½-wavelength plate for rotating the polarization direction of light on a central optical path 90 degrees is arranged between said first optical-path controlling birefringent element and said second optical-path controlling birefringent element.

6. An optical switch comprising:
   a separating birefringent element for separating light on the same optical path into shafts of light having an orthogonal relationship with respect to a polarization direction;

a first optical-path controlling birefringent element for controlling a direction of an optical path depending on the polarization direction;

a second optical-path controlling birefringent element for controlling a direction of an optical path depending on the polarization direction;

a combining birefringent element for combining shafts of light on different optical paths having an orthogonal relationship with respect to the polarization direction, wherein said separating birefringent element, said first optical-path controlling birefringent element, said second optical-path controlling birefringent element, and said combining birefringent element are spaced apart along an optical path in the recited order, and wherein said first optical-path controlling birefringent element and said second optical-path controlling birefringent element are oppositely arranged such that optical axes thereof are symmetrical with respect to an arrangement center thereof;

a first polarization rotating member including a ±45 degree variable Faraday rotator, said first polarization rotating member being operable to change a relationship of the polarization direction of shafts of light passing therethrough from an orthogonal relationship to a parallel relationship, said first polarization rotating member being arranged between said separating birefringent element and said first optical-path controlling birefringent element;

a second polarization rotating member including a ±45 degree variable Faraday rotator, said second polarization rotating member being operable to change a relationship of the polarization direction of shafts of light passing therethrough from a parallel relationship to an orthogonal relationship, said second polarization rotating member being arranged between said second optical-path controlling birefringent element and said combining birefringent element;

a ½-wavelength plate for rotating the polarization direction of light on a central optical path 90 degrees, said ½-wavelength plate being arranged between said first optical-path controlling birefringent element and said second optical-path controlling birefringent element; and input ports arranged on a side of said separating birefringent element, and output ports arranged on a side of said combining birefringent element.

7. The optical switch of claim 6, wherein each of said first polarization rotating member and said second polarization rotating member further includes:

a set of two ½-wavelength plates arranged side-by-side symmetrically with respect to optical axes thereof and on the optical paths of the shafts of light, each of the ½-wavelength plates being operable to rotate a polarization direction of the respective shaft of light passing therethough 45 degrees; and a ½-wavelength plate for rotating the polarization direction of light on a lower-staged optical path 90 degrees.

8. The optical switch of claim 7, wherein said first polarization rotating member and said second polarization rotating member are arranged symmetrically about a center of said optical circulator.

9. The optical switch of claim 7, wherein said ±45-degree variable Faraday rotator, said set of two ½-wavelength plates, and said ½-wavelength plate of each of said first polarization rotating member and said second polarization rotating member are spaced apart along the optical path in the recited order.

10. The optical switch of claim 6, wherein only said ½-wavelength plate for rotating the polarization direction of light on a central optical path 90 degrees is arranged between said first optical-path controlling birefringent element and said second optical-path controlling birefringent element.

* * * * *